*E. C. Savage.*
*Hooks & Eyes.*
Nº 3512.   Patented Mar. 26. 1844.
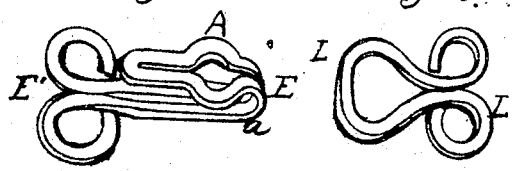

UNITED STATES PATENT OFFICE.

ELISHA C. SAVAGE, OF HARTFORD, CONNECTICUT.

HOOK AND EYE.

Specification of Letters Patent No. 3,512, dated March 26, 1844.

*To all whom it may concern:*

Be it known that I, ELISHA C. SAVAGE, of Hartford, in the county of Hartford and State of Connecticut, have invented a new and useful improvement in hooks and eyes to prevent them from unhooking, which I denominate the "Elliptic spring-hooks"; and I do hereby declare that the following is a full, clear, and exact description thereof, reference being had to the accompanying drawing, which forms a part of this specification, in which—

Figure 1 is the perfect hook; Fig. 2, the eye; Fig. 3, the form of the hook before it receives the last turn showing the two sides separate.

The hook is formed of any kind of wire used for the common hooks and eyes; they are made and flattened similar to the common hooks, but, instead of closing the two sides of them as in the ordinary manufacture, the sides are separated from near the eyes E' (which touch each other) till they reach a point just beyond where they receive the last turn (*a*), where they curve outward, forming segments of a ring at A, and then close together to the point of the hook; the curved part A is large enough to prevent its passing through the eye without springing in the sides of the hook, which prevents it from unhooking readily, by assuming again its position.

The eyes are formed in the ordinary way and is represented in the drawing at Fig. 2.

Having thus fully described my improvement, I wish it to be understood that I do not claim constructing a hook with a spring for preventing the eye from unhooking as that has already been effected in various ways, but

What I do claim as my invention and desire to secure by Letters Patent is—

Constructing a hook in the manner described above; the sides of said hook being separate, from just beyond the eyes thereof, to a point beyond the last turn of the hook (*a*), where the sides recede from each other forming projections, over which the eye can only pass by springing in the sides of the hook, arranged in the manner and for the purpose herein set forth.

ELISHA C. SAVAGE.

Witnesses:
GEO. S. LINCOLN,
LEVI LINCOLN.